United States Patent [19]

Svedberg

[11] 4,191,384
[45] Mar. 4, 1980

[54] METHOD AND DEVICE FOR SEALING A PIPE JOINT

[75] Inventor: Lennart Svedberg, Bredaryd, Sweden

[73] Assignee: Forsheda Gummifabrik AB, Forsheda, Sweden

[21] Appl. No.: 893,038

[22] Filed: Apr. 3, 1978

[51] Int. Cl.² .................... F16J 15/06; B23Q 3/00
[52] U.S. Cl. ............................... 277/1; 277/915; 285/39; 285/308; 29/235
[58] Field of Search ............. 285/39, 308; 277/1, 277/9.5; 29/235, 450

[56] References Cited

U.S. PATENT DOCUMENTS

| | | | |
|---|---|---|---|
| 2,479,960 | 8/1949 | Osborn | 285/39 |
| 3,745,686 | 5/1956 | Anderson | 29/235 |
| 3,884,510 | 5/1975 | Beam | 285/39 |
| 3,947,944 | 4/1976 | Washington | 277/1 |
| 4,127,431 | 11/1978 | Susujara | 29/235 |

FOREIGN PATENT DOCUMENTS

2144424 9/1973 France .

*Primary Examiner*—Robert I. Smith
*Attorney, Agent, or Firm*—Howson and Howson

[57] ABSTRACT

A method for providing a seal between two pipes of the type in which one circumferential end portion of one pipe has an enlargement to provide an internal circumferential channel into which the unenlarged end of the other pipe can be telescoped, the space between the interior of this channel and the exterior of the inner pipe end containing an annular seal ring of the type having a K cross-section in which the oblique arms of the K constitute sealing lips facing radially and obliquely inwardly of the channel, one canted axially inwardly and the other canted axially outwardly of the channel. An axially-slotted elastomeric cylinder is compressed and inserted between the two adjacent ends of the pipes as they are moved to this telescoped position, to hold the axially-outwardly canted lip bent radially outward to a diameter greater than the outer diameter of the inner pipe while the inner pipe is being inserted; the cylinder is then released by withdrawing it, to permit the axially-outwardly canted lip to spring back into its desired sealing position. This procedure avoids damage otherwise likely to occur to the latter lip during insertion.

4 Claims, 4 Drawing Figures

METHOD AND DEVICE FOR SEALING A PIPE JOINT

This invention relates to a method and a device for sealing a pipe joint said device comprises a sealing ring provided in a circumferential channel in an end portion of one of the pipes to be jointed and in the annular clearance defined between the end portions of the pipes when inserted in each other.

When sealing joints in such pipes as are used for indoor or underground drainages, culverts or such conduits as are immersed in water of varying pressure, use is often made of lip sealing rings of symmetrical design. The lip sealing ring is usually provided in an inside channel in the vicinity of the end of one of the pipes to be jointed, whilst the other pipe is introduced into the end portion and through the sealing ring provided in the first pipe. If, however, the lip sealing ring is of a double faced type so that the cross section thereof approximately has the shape of a K with one sealing lip directed obliquely towards the end of the pipe and one sealing lip directed obliquely into the pipe, it will be practically impossible to introduce through the lip sealing ring a straightly cut off pipe in such a way that the sealing lips are not damaged but are placed in correct positions. In order to make it possible at all to insert an end portion of a pipe through such a lip sealing ring the end portion has to be bevelled very carefully or otherwise specially designed for the purpose. This is a considerable drawback as the pipes are often cut to correct lengths which implies that a prefabricated, properly designed end portion of a pipe can not be utilized. The only possibility to accomplish a joint in such a situation is to try to re-shape the end portion after having cut the pipe.

The object of this invention is to provide a method and a device of the type mentioned above for sealing a pipe joint said method and device being such that the drawbacks mentioned above are eliminated. According to the invention this is achieved by providing a mounting ring for urging the sealing ring against the bottom of the channel, said mounting ring being dimensioned for being accepted in the annular clearance, and by said mounting ring being removable from said clearance after insertion of the pipe end portions into each other.

In a much used type of pipe joint the lip sealing ring and the channel are provided internally in an end portion of the outer pipe. In an embodiment of the invention designed for this type of joint the mounting ring has the shape of a cylindrical sleeve having at one end thereof a radially protruding flange, said sleeve, when inserted in the end portion of the outer pipe, covering and urging against the bottom of the channel a sealing lip of a sealing ring directed obliquely towards the end of said pipe.

According to the invention it is preferable that the mounting ring is provided with an axially directed through-slot and that the outside diameter of the sleeve portion thereof approximately equals the inside diameter of the end portion of the outer pipe when the end surfaces of the mounting ring are abutting each other.

The invention will be described more in detail below; reference is being made to the drawings on which FIG. 1 is a cross sectional, exploded view showing partially the pipe joint before assembly thereof.

The pipes constituating the pipe joint will hereinafter be referred to as the outer pipe and the inner pipe respectively even if the outer pipe could be a pipe coupling of short length or a pipe with a widened end portion as well, whilst a main portion of the inner pipe can be of the same diameter as the outer pipe and an end portion thereof can be of a slightly lesser diameter. The only important fact is that an end portion of the inner pipe can be inserted or telescoped into an end portion of the outer pipe. The pipes of interest for carrying the invention into effect can have dimensions varying within wide limits and can be made from several different materials such as metal or plastics. A typical example of a pipe suited for carrying the invention into effect is a plastics pipe of 10 cm diameter and a wall thickness of approx. 3 mm. Pipes of this kind are usually used as drain pipes.

Figure 1:
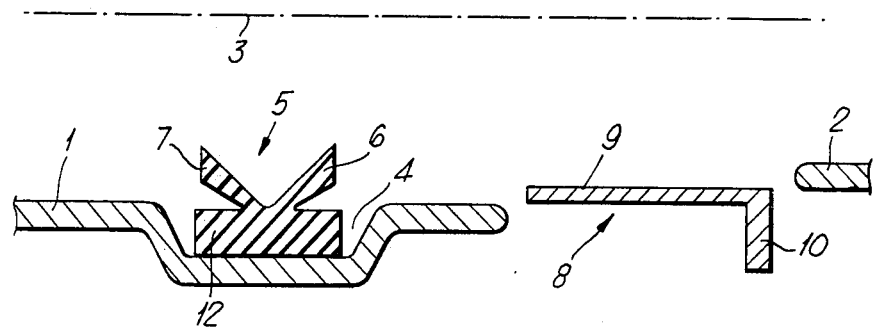

As is apparent from FIG. 1 the outer pipe 1 has an internally provided channel 4 in which there is provided a sealing ring 5. The center line of the joint and the pipe 1 is indicated by the numeral 3 in FIG. 1.

The sealing ring 5 is of a double faced type and provides sealing effect against internal pressure and external as well. As is evident from the drawing the sealing ring has a substantially K-shaped cross section and is provided with an outer sealing lip 6 directed obliquely towards the end of the pipe and an inner sealing lip 7 directed obliquely towards the main portion of the pipe. The sealing ring 5 is made from soft rubber or another elastomeric material and the sealing lips 6 and 7, thus easily deformable, are protruding in an unstressed state rather far into the cross section of the pipe. FIG. 1 also shows a mounting ring 8 the purpose of which is to urge at least the outer sealing lip 6 radially outwardly against the bottom of the channel 4 so that the end portion of the inner pipe 2 can be inserted through the sealing ring 5 without use is being made of an antifriction agent and without causing damage to the sealing ring and in such a manner that the two sealing lips get correct positions.

Figure 4:
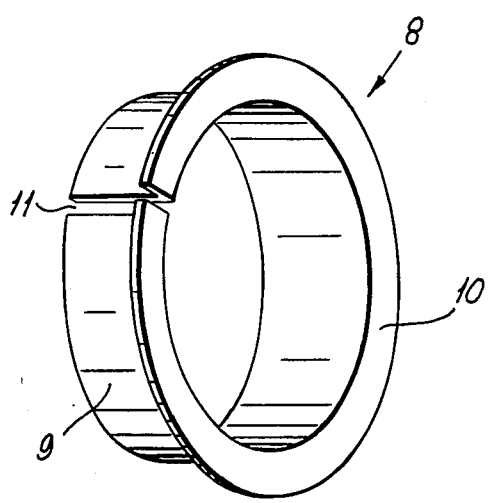
FIG. 4 is a perspective view showing the mounting ring.

In FIG. 4 there is shown that the mounting ring 8 has a thin walled sleeve portion 9 of cylindrical shape and a flange portion 10 fastened thereto and extending radially outwardly from one end of said sleeve portion 9. When the pipe has the dimensions mentioned above the sleeve portion 9 preferably has a wall thickness in the range of 1–2 mm. Further, the mounting ring 8 has an axially directed through-slot the purpose of which will be described more in detail below. The mounting ring is preferably made from a semi-hard and to some degree elastic plastics material but can also be made from metal. The sleeve portion 9 of the mounting ring 8 is dimensioned in such a way that the outside diameter thereof is only slightly less than the inside diameter of the end portion of the outer pipe 1 when the slot 11 is closed and the end surfaces of the ring are abutting each other. The inside diameter of the mounting ring exceeds in this condition only slightly the outside diameter of the end portion of the inner pipe 2.

Figure 2:
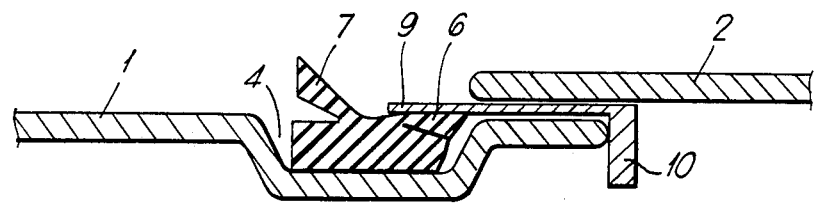
FIG. 2 shows in a corresponding view the pipe joint during assembly.
Figure 3:
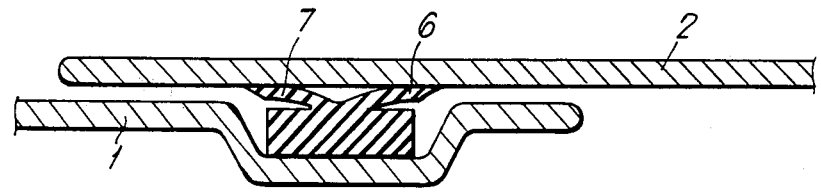
FIG. 3 is a cross sectional view showing partially the pipe joint after assembly thereof.

In FIG. 2 the mounting ring 8 is shown fitted in the end portion of the outer pipe 1 the flange 10 abutting the end surface of the outer pipe. As is evident from the drawing the sleeve portion 9 urges the outer sealing lip 6 of the sealing ring radially outwardly against the bottom of the channel 4 so that the end portion of the inner pipe 2 can be inserted through the sealing ring 5 without use is being made of an anti-friction agent and without causing any damage to the sealing lips. In FIGS. 1-3 the end surface of the inner pipe 2 is shown as being rounded but the shape of this surface is not of importance according to the invention and can therefore have any shape being determined by the method of cutting the inner pipe 2 to the intended length. The inner pipe does not need to be cut off at a right angle but can also be obliquely cut off to some degree.

In FIG. 3 there is shown the completed pipe joint of the invention. It is evident from the drawing that the sealing lips 6 and 7 are deformed due to their elasticity and that they are bearing on the outer surface of the inner pipe 2. If the pipe is exposed to an external pressure the outer sealing lip 6 thereby will be pressed even harder against the outer surface of the inner pipe 2. The same condition is true for the inner sealing lip 7 if the pipe is exposed to an internal pressure. By the elasticity of the sealing ring 5 and by the small clearance defined between the inner and the outer pipes this type of joint also permits a certain degree of angular displacement of the center lines of the inner and the outer pipes.

The method of assembly the pipe joint according to the invention is carried out in the following way: the sealing ring 5 is brought in position in the internal channel 4 of the outer pipe 1 which can be easily done as the sealing ring 5 is made from soft elastic rubber. Then the mounting ring 8 is compressed so that the end surfaces thereof are displaced past each other. The mounting ring 8 is compressed so far that the outside diameter of its sleeve portion 9 is less than the inside diameter of the sealing ring 5 when being in un-stressed condition. Then the mounting ring 8, thus compressed, is inserted into the end portion of the outer pipe 1 and the mounting ring is allowed to expand so that the sealing ring is deformed to a condition between the conditions of FIGS. 1 and 2, respectively, thereby the sealing lip is folded towards the free end of the outer pipe. The final expanding of the mounting ring is carried out by having the end surfaces of the mounting ring brought to abuttment against each other so that the outer surface of the mounting ring is quite smooth and circular as is the case for the inner surface thereof as well. In this condition the mounting ring has the position shown in FIG. 2 and the radially inwardly facing surface of the sealing lip is substantially cylindrical, thus the sealing lip being in a stretched condition. Then the end portion of the inner pipe 2 is introduced through the mounting ring 8 and the sealing ring 5, the inner sealing lip 7 hereby being expanded by the pipe end so that it is brought to bear on the outer surface of the inner pipe. When the pipes 1 and 2 has been telescoped to correct positions relatively each other the mounting ring is removed by gripping it at the flange 10 and axially sliding it along the inner pipe 2. When the sleeve portion 9 of the mounting ring 8 is completely free of the end portion of the outer pipe 1 the sealing ring 5 has the position of FIG. 3. Either can the mounting ring 8 be left on the inner pipe 2 or can it be removed by widening the slot 11 so that it can be forced over the inner pipe.

According to the invention the sealing ring 5 and the mounting ring 8 as well preferably can be preassembled and delivered together with the outer pipe. In such a case it is also possible to provide an indication of fracture instead of the slot 11 in the mounting ring which permits the mounting ring to be cracked and removed from the inner pipe after the pipe joint has been completed.

According to the invention it is also possible to provide the channel for accepting the sealing ring externally on the inner pipe. In this case the slot 11 must be omitted or must the mounting ring be kept compressed by suitable means when the outer pipe is telescoped onto the mounting ring and the sealing ring.

Even if the sealing ring is not of the double faced type the invention can be carried into effect. This could be the case if the pipe joint is designed to withstand external pressure and thus the sealing ring is provided with one or more sealing lips directed in the same manner as the sealing lip 6 according to the invention.

I claim:

1. The method of placing in correct position the annular sealing lip of an elastomeric sealing ring when assembling a pipe joint by inserting one end of an inner pipe into one end of an outer pipe, said completed pipe joint comprising said elastomeric sealing ring seated in a circumferential inner channel in said outer pipe, said annular sealing lip protruding obliquely inwardly and against the direction of insertion of said inner pipe for making a seal between said inner and outer pipes when said assembly of said pipe joint has been completed, comprising:

placing said ring in said channel prior to insertion of said inner pipe;

inserting into the central opening of said annular sealing lip a radially-expandable generally-cylindrical mounting guide which, upon insertion thereof, is of smaller diameter than said central opening;

thereafter expanding said mounting guide radially to stretch said lip to an inner diameter at least as great as the outer diameter of said one end of said inner pipe;

while said lip is so stretched, inserting said one end of said pipe through the interior of said mounting guide to a position within said opening in said stretched lip; and thereafter withdrawing said mounting guide and permitting its said lip to contract and bear against the outside surface of said end portion of said inner pipe.

2. The method of claim 1, wherein said sealing lip during said stretching is folded against the direction of insertion of said inner pipe, and the inward-facing surface of said stretched lip is thereby given a substantially cylindrical shape.

3. The method of claim 1, wherein said sealing ring comprises a second annular sealing lip extending obliquely inwardly and along the direction of insertion of said inner pipe, said second sealing lip being left unstretched during said stretching of said first-named sealing lip and thereafter is stretched by further insertion of said inner pipe so that said second sealing lip surrounds and engages the outside surface of said inner pipe.

4. The method of claim 1, wherein said mounting guide is a longitudinally slotted resilient cylinder, said insertion thereof into said central opening of said annular sealing lip comprises compressing said cylinder to an outer diameter less than that of said central opening, and said expanding thereof comprises reducing the compression of said mounting guide.

* * * * *

UNITED STATES PATENT AND TRADEMARK OFFICE
CERTIFICATE OF CORRECTION

PATENT NO. : 4,191,384
DATED : 3/4/80
INVENTOR(S) : Lennart Svedberg

It is certified that error appears in the above-identified patent and that said Letters Patent are hereby corrected as shown below:

In the heading, after "Filed: April 3, 1978" should read

--[30] Foreign Application Priority Data

March 21, 1978 [SE] Sweden..............7704149 --.

Signed and Sealed this

Twenty-seventh Day of May 1980

[SEAL]

Attest:

SIDNEY A. DIAMOND

Attesting Officer    Commissioner of Patents and Trademarks